United States Patent
Kates et al.

[11] Patent Number: 6,127,809
[45] Date of Patent: *Oct. 3, 2000

[54] ADAPTIVE POWER BATTERY CHARGING APPARATUS

[75] Inventors: Barry K. Kates, Austin; Edward P. Sheehan, Jr., Cedar Park, both of Tex.

[73] Assignee: Dell USA, L.P., Round Rock, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/290,089

[22] Filed: Apr. 12, 1999

Related U.S. Application Data

[63] Continuation of application No. 08/974,128, Nov. 19, 1997, Pat. No. 5,939,862, which is a continuation of application No. 08/546,458, Oct. 20, 1995, Pat. No. 5,698,964.

[51] Int. Cl.[7] .................................................. H02J 7/00
[52] U.S. Cl. ......................................... 320/134; 320/164
[58] Field of Search ................................... 320/128, 134, 320/136, 135, 162, 163, 164; 324/433; 340/636

[56] References Cited

U.S. PATENT DOCUMENTS

| | | | |
|---|---|---|---|
| 4,384,214 | 5/1983 | Crick et al. | 307/66 |
| 4,843,299 | 6/1989 | Hutchings | 320/31 |
| 4,885,523 | 12/1989 | Koenck | 320/21 |
| 5,150,032 | 9/1992 | Ho | 320/14 |
| 5,239,495 | 8/1993 | Nanno et al. | 364/707 |
| 5,349,282 | 9/1994 | McClure | 320/32 |
| 5,382,893 | 1/1995 | Dehnel | 320/32 |
| 5,418,445 | 5/1995 | Alpert et al. | 320/14 |
| 5,465,039 | 11/1995 | Narita et al. | 320/32 |
| 5,523,670 | 6/1996 | Ninomiya | 320/20 X |
| 5,532,524 | 7/1996 | Townsley et al. | 364/707 X |
| 5,532,935 | 7/1996 | Ninomiya et al. | 364/707 X |
| 5,561,361 | 10/1996 | Sengupta et al. | 320/14 |

*Primary Examiner*—Edward H. Tso
*Assistant Examiner*—Gregory J. Toatley, Jr.
*Attorney, Agent, or Firm*—Skjerven, Morrill, MacPherson, Franklin, & Friel, L.L.P.; Stephen A. Terrile

[57] ABSTRACT

An adaptive battery charger for charging batteries used in portable electronic devices. The battery charger monitors power provided from an AC adapter to the portable electronic device, and adaptively utilizes all available power from the AC adapter for charging the batteries, both when the portable electronic device is off, and when it is in use. As the power required for the portable electronic device increases, the power provided to the batteries decreases. As the power required to power the portable electronic device decreases, the power available to charge the batteries increases.

19 Claims, 2 Drawing Sheets

ADAPTIVE POWER BATTERY CHARGING APPARATUS

The present application is a continutation of application Ser. No. 08/974,128, filed Nov. 19, 1997 now U.S. Pat. No. 5,939,862 which is a continuation of application Ser. No. 08/546,458, filed Oct. 20, 1995 now U.S. Pat. No. 5,698,964.

BACKGROUND

1. Field of the Invention

This invention relates in general to the field of battery charging devices, and more particularly to those battery charging devices that also supply power to additional electrical loads.

2. Description of the Related Art

Portable computers, personal digital assistants (PDA's), cellular telephones, pagers, calculators, and other such electronic devices are commonplace in today's mobile society. One of the reasons portable electronic devices are so popular is that they provide a user with virtual freedom regarding the location of their use, as long as a source of power is readily available. Although these devices may be powered by plugging them into a standard AC outlet, AC power is often not convenient or readily available. Hence, their real portability and utility comes from their being powered by batteries.

Early portable devices relied on rechargeable lead-acid batteries to provide them with power. However, for some devices such as portable computers, the power requirements were so great that the "on-time" of the device, i.e., the useful battery life between charges, was often measured in minutes, rather than hours. In addition, early rechargeable batteries were inefficient at recharging, having recharge times three to four times that of their useful life. For example, one early portable computer manufactured by the assignee of the present invention had an on-time of approximately 45 to 100 minutes, with a recharge time of approximately 6 to 8 hours. For many users, this amounted to an overnight charge to obtain an hour or so of useful life during the day. What was needed, and what the market has continually demanded, is longer lasting (higher watt-hour) batteries, as well as batteries having faster recharge times.

Although there have been tremendous improvements in battery technology, other factors important to the marketplace have developed. Users not only want longer life, with shorter recharge times, they also want to be able to charge their batteries while still using their portable device (for faster recharging), and they want to carry as few items as possible, having as little weight as possible, when traveling with their portable device. Another example will help illustrate this point.

Early portable computers operated from an array of rechargeable lead acid batteries which provided portable power. These arrays, or battery packs, weighed between 1.5 and 3 pounds. To recharge a battery pack, a battery charger was required which converted AC power into DC power appropriate for recharging the battery pack. The battery pack was inserted into the charger for charging, and later removed and placed into the portable device for use. This charger was also a bulky device which the user was required to carry. In addition, an AC adapter was also required which could provide power to the portable computer when the battery pack was recharging. Thus, a "portable" computer user, while traveling, was required to carry: 1) the computer; 2) the rechargeable battery pack; 3) the recharger; and 4) the AC adapter. This combination was bulky and cumbersome.

The marketplace has therefore demanded, in addition to improved battery technology as referenced above, a system for recharging that is more manageable.

A first solution to the above stated problems was to move the electronics required for charging the battery pack into the portable device. With this solution, the AC adapter is now used to provide DC power to the portable device, both for operation of the device, and for recharging of the battery pack. But, as the power requirements of the portable device increased, the size and cost of the AC adapter also increased. To keep the cost and size of the AC adapter to a minimum, the AC adapter is typically designed to provide just enough power to operate the portable device, but no more. With this arrangement, the AC adapter provides power to the portable device while the portable device is being used, but no additional power is provided to battery pack for charging. When the portable device is turned off, charging of the battery pack begins, or resumes. This solution has been chosen by many portable computer manufacturers because it allows the least expensive and smallest AC adapters to be used.

However, this solution does not allow the battery pack to be charged while the portable device is in use. This results in longer charge cycles for those instances when a user requires operation of the portable device. A solution to this problem is to provide an AC adapter that is capable of providing the maximum power required by the portable device, plus that power required for recharging the battery pack. This allows simultaneous use of the portable device, and recharging of the battery pack. But this solution comes with a price: while allowing a user maximum versatility, with minimum charge time, the AC adapter increases both in size and expense.

A compromise in the above two solutions is to provide an AC adapter with a small amount of overhead which can power a portable device, and simultaneously supply a small amount of charge current to the battery pack. When the portable device is being used, the battery pack is charged with one fixed current. When the portable device is not being used, i.e., is turned off, the battery pack is charged with a second higher current. This two charge rate compromise allows a smaller, less costly AC adapter than mentioned above, yet still allows the battery pack to be charged while the portable device is on. Yet, the compromise provides for only two rates of charging. Such a two rate system results in excessive charge times, or oversized AC adapters. In addition, such a fixed rate system fails to recognize that the portable device does not always require maximum power when in operation.

For the foregoing reasons, there is a need for a high performance adaptive power battery charging apparatus that will allow simultaneous charging of a battery pack and operation of a portable device, that takes advantage of the variance in power requirements of the portable device and adaptively charges the battery pack with the remaining power supplied by the AC adapter.

SUMMARY

To address the above-detailed deficiencies, it is an object of the present invention to provide a battery charging system which minimizes the charge time for a battery within a portable electronic device.

Accordingly, in the attainment of the aforementioned object, it is a feature of the present invention to provide an adaptable power battery charger system which includes: a battery which is connected to a portable electronic device; a power source, also connected to the battery, and connected to the portable electronic device, to provide power to the battery for charging, and to the portable electronic device for use; and power control circuitry, connected to the power source and to the battery, which monitors the power provided to the battery and to the portable electronic device by the power source, and which adaptively regulates the power to the battery based on the available power from the power source, and the power requirements of the battery.

It is an advantage of the present invention that the use of the power control circuitry to adaptively regulate power to the battery provides for maximum power utilization, and therefore minimum charge time for a given power budget. Without requiring a power source to provide more power than is required for the portable electronic device, the power control circuitry extracts all of the power from the power source that is not used by the portable electronic device, and makes this power available to the battery for charging.

Another feature of the present invention is to have an adaptive battery charging system which includes: an electrical load; a battery system, connected to the electrical load; a first signal, connected to the battery system, which indicates the amount of current provided to the battery system; a second signal, connected to the battery system, which indicates the voltage across the battery system; and power control circuitry, electrically connected to the electrical load, and to the battery system, which provides power to the electrical load, and to the battery system to charge the battery system, where the power control circuitry is connected to the first and the second signals, and varies the amount of power supplied to the battery system in response to the first and the second signals.

In an alternative embodiment, an additional feature of the present invention is to provide an adaptive power battery charger, which provides power to both an electrical load, and to a battery system, which varies the power provided to the battery system as the power required by the electrical load changes. The battery charger includes: an adapter, which has a maximum power output, connected to the electrical load and to the battery system, which provides electrical power to both the electrical load and the battery system; a first sensor, connected to the battery system, which monitors the power provided to the battery system, and indicates the amount of power provided to the battery system; a second sensor, connected to the adapter, which monitors the power provided by the adapter, and indicates the amount of power provided by the adapter; and modulation circuitry, connected to the adapter, to the battery system, and to the first and the second sensors, which varies power to the battery system in response to the amount of power provided to the battery and by the adapter, as indicated by the first and the second sensors.

A further feature of the present invention is to provide a first sensor which includes: a current sensor, connected to the battery system, which determines the amount of current provided to the battery system; and produces a first signal which indicates the amount of current provided to the battery system; a voltage sensor, connected to the battery system, which determines the voltage across the battery system, and provides a second signal indicative of the amount of voltage across the battery system; wherein the first and the second signals are indicative of the amount of power provided to the battery system.

An additional feature of the present invention is to provide modulation circuitry, wherein the modulation circuitry includes: a pulse width modulator, connected between the adapter and the battery system, for providing a power output to the battery system which varies according to the value of the first and the second sensors; and an LC circuit, connected between the pulse width modulator and the battery system, for converting the output of the pulse width modulator into a DC signal which can be used to charge the battery system.

An advantage of this invention is that it optimizes the ac adapter utilization and provides the shortest possible charging time for a given power budget.

The foregoing has outlined rather broadly the objects, features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

DESCRIPTION OF THE DRAWINGS

These and other objects, features, and advantages of the present invention will become better understood with regard to the following description, appended claims, and accompanying drawings where:

DETAILED DESCRIPTION

Figure 1:
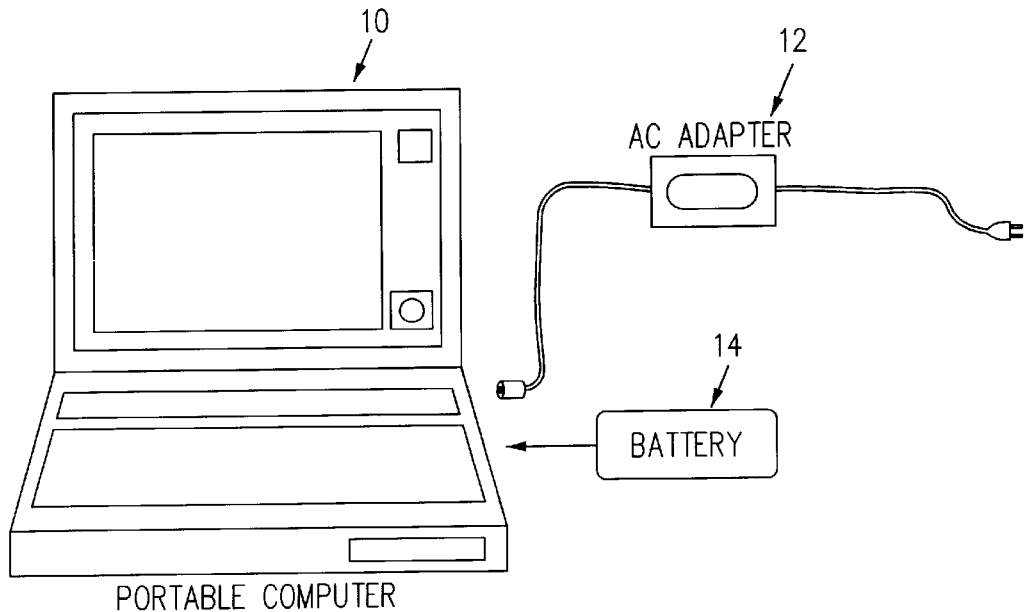
FIG. 1 is a view illustrating a portable computing device incorporating the present invention.

Referring to FIG. 1, a portable computer 10 is shown. The computer 10 may be connected to an AC adapter 12, which is in turn connected to a power source (not shown). A battery pack 14 is also shown which resides within the computer 10. The AC adapter 12 converts AC power into DC power that can be used to power the computer 10, or to charge the battery pack 14.

As discussed above, in prior art systems, the AC adapter either charges the battery pack 14 when the computer 10 is off or supplies power to the computer 10 when the computer is on. In a second type of prior art computer, the AC adapter provides a small fixed current to the battery pack 14 when the computer 10 is on, and a second fixed current when the computer 10 is off. What is discussed below, with reference to FIGS. 2–3, is a variable rate battery charger that adapts to the changing load requirements of a portable device, and utilizes all available power from the AC adapter to charge the battery pack.

Figure 2:
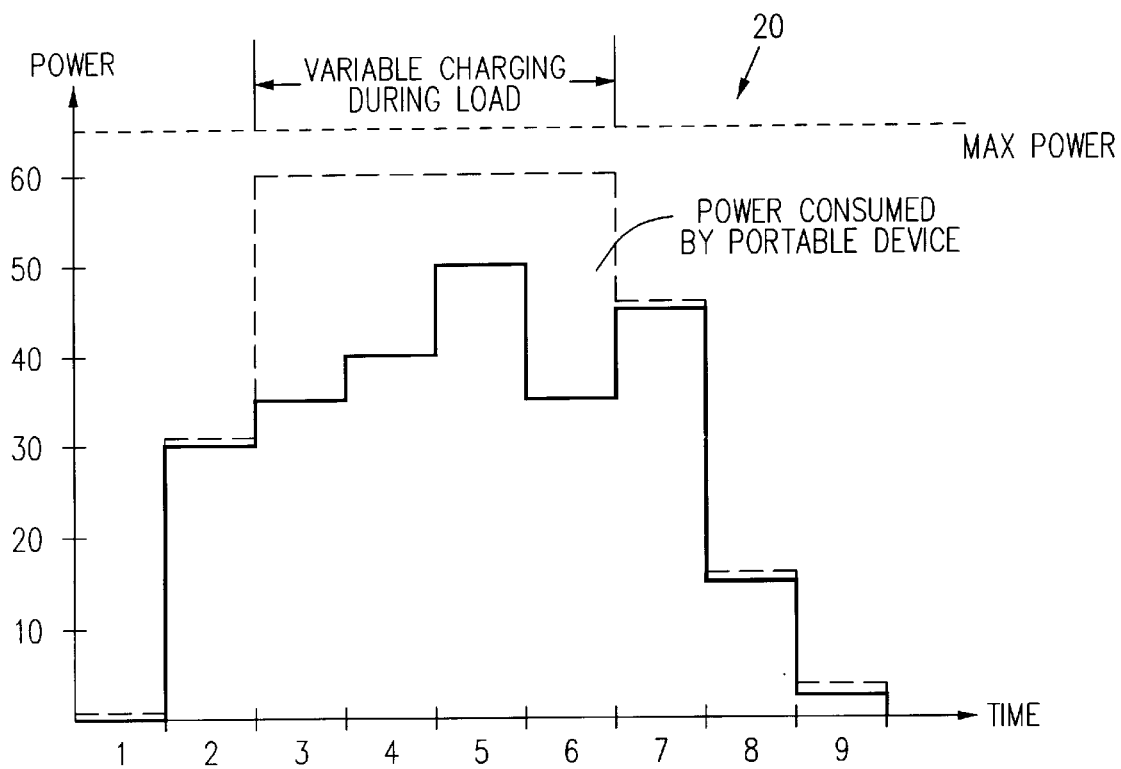
FIG. 2 is a chart illustrating battery charging versus time according to the present invention.
Figure 3:
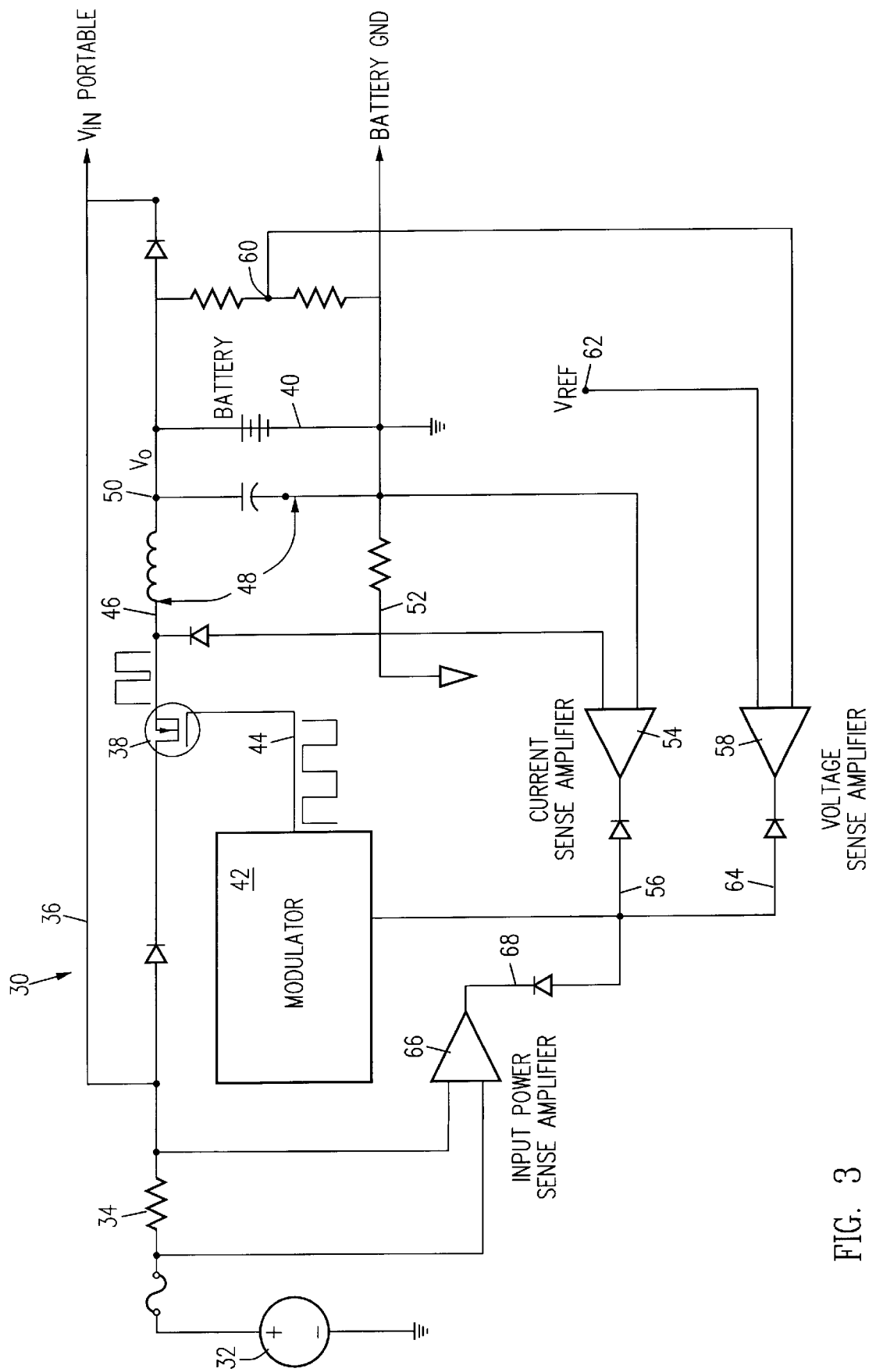
FIG. 3 is a schematic diagram illustrating circuitry of one embodiment of the present invention.

Referring to FIG. 2, a chart 20 is shown which illustrates a typical charge cycle for a battery pack within a portable device which incorporates the present invention. The chart provides a relative time scale on the x-axis with time periods designated as t1, t2, t3, etc., and a y-axis indicating power in watts. It should be understood that the time periods indicated do not reflect absolute time, but rather, are simply indicators of changed conditions during a charge cycle. Note: the elements of the present invention will be discussed below, in reference to FIG. 3. An AC adapter 12 is provided which has a maximum power output specified as 65 watts.

To allow a margin of error, a maximum output power for the AC adapter 12 is set at 60 watts. In addition, a portable computer 10 is utilized which incorporates power management features present in many of the computers on the market today. Power management features allow the computer 10 to power off particular subsystems that are not being used, thus conserving power, and later power these subsystems back on. An example of a subsystem would be a hard disk, an CD monitor, a CPU, or memory.

During time t1, the portable computer 10 is turned off, and the battery 14 is not present within the computer 10. Thus, no power is provided by the AC adapter 12.

During t2, a battery pack 14 is inserted into the computer 10. The battery pack 14 is fully drained, and therefore attempts to draw infinite current. As discussed below with reference to FIG. 3, the present invention limits the charge current to 3 amps. If the battery pack is at 10 volts, the power into the battery pack is 30 watts. The present invention provides the required 30 watts to the battery pack 14 during t2.

At time t3, the portable computer 10 is turned on. The portable computer 10 requires 25 watts of power from the AC adapter, and such power is provided. At this point, the voltage of the battery pack 14 may have increased to say 12 volts. The battery pack 14 therefore desires to draw 36 watts of power from the ac adapter (3 amps×12 volts). However, since the portable computer 10 is drawing 25 watts, only 35 watts of power is available to the battery pack 14, and such is provided.

At time t4, a first subsystem (not shown) within the computer 10 is powered down. Thus, the computer 10 now requires only 20 watts of power for operation. This leaves 40 watts available for the battery pack 14. At this time, the voltage of the battery pack 14 has reached 14 volts, for example. The battery pack 14 therefore desires to draw 3 amps×14 volts, or 42 watts. The present invention provides all available power, i.e., 40 watts, to the battery pack 14 for charging.

At time t5, a second subsystem (not shown) within the computer 10 is powered down. Thus, the computer 10 now requires only 10 watts of power for operation. This leaves 50 watts of power available for the battery pack 14 for charging. At this point, the voltage of the battery has reached 16 volts, for example. The battery pack 14 therefore is allowed to draw 3 amps×16 volts, or 48 watts of power for charging.

At time t6, the first two subsystems within the computer 10 are powered back on. Thus, the computer 10 now requires 25 watts of power for operation. This leaves approximately 45 watts of power available for charging the battery pack 14. The battery pack 14 is still not fully charged, so the present invention provides the remaining 45 available watts from the AC adapter to the battery pack 14.

At time t7, the computer 10 is powered off. . The battery pack 14 is still not fully charged, but neither is it fully drained, so its voltage level has increased, say to 16.5 volts. However, the battery pack 14 is no longer drawing a full 3 amps. Rather, it is now drawing approximately 2.7 amps. To charge the battery pack 14 at 2.7 amps, the AC adapter now provides approximately 45 watts to the battery pack 14.

At time t8, the battery pack 14 is becoming fully charged. Its voltage is approaching 16.8 volts, but it is now drawing less than 1 amp of current. The AC adapter therefore provides 16 watts to the battery pack.

At time t9, the battery pack 14 is almost fully charged, and only requires 3 watts of power from the AC adapter 12. At the end of time t9, the battery is fully charged, and no longer requires power from the AC adapter 12.

Summarizing the above with respect to FIG. 2, the present invention adaptively provides to the battery pack 14 the maximum available power from the AC adapter 12, that is not required by the computer 10. As the power demands from the computer 10 increase, the power supplied to the battery pack 14 decreases. As the power demands from the computer 10 decrease, the available power to the battery pack 14 increases. For a more detailed discussion of an embodiment of the present invention that performs the functionality discussed above, refer now to FIG. 3.

In FIG. 3, an adaptive battery charging apparatus 30 is schematically shown. In the embodiment which is discussed, a battery 40 is provided which is specified with a maximum charge current of 3 amps, and a fully charged voltage equal to 16.8 volts. It should be understood by one skilled in the art that the specified charge current, and fully charged voltage, are for illustrative purposes only, and may vary depending on the type of battery that is used.

The charging apparatus 30 is electrically connected to a DC source 32. Note that the DC source 32 may be derived from the output of an AC adapter, or by other conventional means. Current flows from the DC source 32, through a current sense resistor 34, and onto a power line 36, to supply power to a portable device (not shown). The voltage at the output of resistor 34 is termed $V_{in}$. In addition, current through the resistor 34 flows into a gated FET 38 for providing power to the battery 40.

The FET 38 is gated by a modulator 42 which regulates the output of the FET 38 via control line 44. The output of the FET 38 is a modulated pulse train which is transmitted, via line 46, through an LC filter 48. The output of the LC filter 48 is approximately a DC voltage at node 50 termed $V_o$. $V_o$ is provided to the battery 40 to charge the battery 40.

At this point, it should be appreciated by one skilled in the art, that:

$$dutycycle = \frac{Vo}{Vin}$$

where the duty cycle relates to the pulse train generated at the FET 38. With a fixed voltage at $V_{in}$, a desired $V_o$ can be created by solving for $V_o=V_{in}$ * duty cycle. Selective modulation of the FET 38 therefore allows control over $V_{in}$, and therefore over the power provided to the battery 40.

Across the LC filter 48 is a current sense resistor 52. Each node of the current sense resistor 52 is connected to a current sense amplifier 54. The current sense amplifier 20 senses the current that is being provided to the battery 40. The current sense amplifier provides an output signal 56 which is fed into the modulator 42. In one embodiment of the present invention, the maximum current that the battery 40 should draw is 3 amps. Thus, in this embodiment, the current sense amplifier 54 is referenced such that if the battery 40 attempts to draw more than 3 amps, the amplifier 54 provides a signal 56 to the modulator 42 to reduce the voltage at $V_o$ and thereby regulate the power provided from the FET 38 to the battery 40 at precisely 3 amps.

A voltage sense amplifier 58 is also provided which is connected to a resistive network 60 and a voltage reference 62. The output of the voltage sense amplifier 58 is provided on signal line 64 to the modulator 42. In the present embodiment, the voltage reference 62 is set to 16.8 volts, i.e., the voltage of the fully charged battery 40. Thus, as the battery 40 is charged, the voltage of the battery 40, and hence, the value of $V_o$ increases towards 16.8 volts. Should the value of $V_o$ attempt to exceed 16.8 volts, the voltage sense amplifier 58 signals the modulator 42 to reduce the duty cycle of the pulse width output of the FET 38 to keep $V_o$ from exceeding 16.8 volts.

An input power sense amplifier 66 is connected to both nodes of the current sense resistor 34. Since the voltage from the DC source 32 is constant, the power provided to the battery 40 and the portable device can be calculated using the equation:

$$P = VI$$

where V equals the voltage at $V_{in}$ and I equals the current through the current sense resistor 34. In the present embodiment, the maximum power available from the DC source 32 is 60 watts. So, a reference point is set for the input power sense amplifier 66 such that it generates a control signal on line 68 to the modulator 42 to indicate when the power provided to the system approaches 60 watts. The modulator 42 regulates the pulse train of the FET 38 to regulate the power input to the battery, plus the power drawn from the portable device, at 60 watts, or less.

To summarize the operation of the adaptive battery charging apparatus 30, power is provided from the DC source 32 to a portable device, and the portable device draws whatever power it needs from the DC source, up to 60 watts. In addition, a battery 40 draws power for charging from the DC source 32. As long as the power drawn from the battery does not cause the DC source 32 to exceed 60 watts of power output, the battery utilizes all of the available power from the DC source 32 for charging. The current sense amplifier 54 and the voltage sense amplifier 58 provide control signals to the modulator 42 to regulate the power that is provided to the battery 40 according to predefined voltage and current specifications for the battery 40. Such regulation, as provided by the charging apparatus 30, allows the battery 40 to always charge using the maximum available power rather than at some predefined trickle charge current. This provides the most efficient charge time for the available power.

Although the present invention has been described in considerable detail with reference to certain preferred versions thereof, other versions are possible. For example, the modulator 42 and the FET 38 could be any device capable of receiving control signals, and from the control signals, regulating a power output. Once such device could be a microcontroller which reads in the control signals from lines 56, 64 and 68, and provides an output which regulates the power at node 46. In addition, the current sense amplifier 54 and the voltage sense amplifier 58 may be replaced with any means for regulating voltage and current to the battery 40 to allow the battery 40 to be charged within its predetermined charge specifications. Thus, it should be understood that the present invention provides a system which allows a battery to be charged in the smallest amount of time for a given power capability of the AC adapter, whether the AC adapter is providing power just to the battery, or also to a portable device.

Although the present invention and its advantages have been described in detail it should be understood that various changes, substitutions and alterations can be made herein without departing from the spirit and scope of the invention as defined by the appended claims.

We claim:

1. An adaptable power battery charger system for a portable electronic device, the portable electronic device including a battery for providing power to the portable electronic device, the battery charger system comprising:

a power source, connected to the battery, for charging the battery, and for connecting to the portable electronic device for providing power to the portable electronic device; and power control circuitry, connected to said power source and to the battery, the power control circuitry monitoring the power provided to the battery and to the portable electronic device by said power source, and varying the power provided by the power source based upon the power needs of the battery as determined by the power needs of the battery being below a maximum power output.

2. The battery charging system as recited in claim 1, wherein the electronic device comprises a portable computing device which may be powered either by the battery, or by said power control circuitry.

3. The battery charging system as recited in claim 1, wherein the battery comprises at least one battery pack for providing power to said electrical load.

4. The battery charging system as recited in claim 3, wherein said battery pack comprises a plurality of lithium-ion cells.

5. The battery charging system as recited in claim 1, wherein said power control circuitry comprises:

an AC adapter for connecting to an alternating power source, the AC adapter for receiving power from the alternating power source; and the AC adapter being connected to said portable electronic device for providing DC power to the portable electronic device.

6. The battery charging system as recited in claim 5, wherein said power control circuitry further comprises:

power modulation circuitry connected to said AC adapter, and to said battery system, said power modulation circuitry receiving a first signal indicative of an amount of current provided to the battery and a second signal indicative of a voltage provided across the battery said power modulation circuitry varying said power supplied to said the battery responsive to said first and said second signals.

7. The battery charging system as recited in claim 5, wherein said power control circuitry is connected to receive a third signal indicative of the power provided by said power control circuitry to the battery and to the electronic device.

8. The battery charging system as recited in claim 7, wherein said power control circuitry limits the amount of power provided to the battery and to the electronic device, in response to said third signal, to a predetermined amount which is below the maximum that can be provided by said power control circuitry.

9. The battery charging system as recited in claim 1, wherein said first and said second indicative signals effect said power control circuitry so as to minimize the charge time of the battery.

10. A portable electronic system comprising:

a portable electronic device;

a battery coupled to the portable electronic device, the battery providing power to the portable electronic device;

a power source coupled to the battery and the portable electronic device, the power source charging the battery and providing power to the portable electronic device; and a power control circuit coupled to the power source and the battery, the power control circuit monitoring the power provided to the battery and to the portable electronic device by the power source and varying the power provided by the power source based upon the power needs of the battery as determined by the power needs of the battery being below a maximum power output.

11. The portable electronic system of claim 10 wherein the portable electronic device may be powered either by the battery or by the power control circuit.

12. The portable electronic system of claim 10 wherein the power control circuit includes an AC adapter coupled to an alternating power source, the AC adapter receiving power from the alternating current source and providing DC power to the battery and the portable electronic device.

13. A portable electronic system comprising:

a portable electronic device;

a battery system coupled to the portable electronic device, the battery system providing power to the portable electronic device;

a power source coupled to the battery system and the portable electronic device, the power source charging the battery and providing power to the portable electronic device; and a power control circuit coupled to the power source and the battery system, the power control circuit monitoring the power provided to the battery system and to the portable electronic device by the power source and varying the power provided by the power source based upon the power needs of the battery system as determined by the power needs of the battery system being below a maximum power output.

14. The portable electronic system of claim 13 wherein the portable electronic device may be powered either by the battery system or by the power control circuit.

15. The portable computer system of claim 13 wherein the power control circuit includes an AC adapter coupled to an alternating power source, the AC adapter receiving power from the alternating current source and providing DC power to the battery and the portable electronic device.

16. The portable computer system of claim 13 wherein the battery system includes a battery; and the battery system provides a first signal indicative of an amount of current provided to the battery system and a second signal indicative of a voltage across the battery; and wherein the power control circuit determines the power needs of the battery based upon the first and second signals.

17. The portable computer system of claim 16 wherein the battery includes a plurality of lithium-ion cells.

18. The portable electronic system of claim 16 wherein the battery system has a charge time representing a time to charge the battery system to a predetermined capacity, and the power control circuit provides power to the battery so as to minimize the charge time of the battery system.

19. An battery charging apparatus for a portable electronic device, the battery charging apparatus varying an amount of power provided to a battery in accordance with an amount of power provided to the portable electronic device thereby allowing the battery to utilize the maximum available power from the battery charging apparatus for charging, the battery charging apparatus comprising:

an AC adapter having a maximum power output coupled to the portable electronic device and to the battery, the AC adapter providing power to the portable electronic device and the battery;

an input power sensor coupled to the AC adapter, the input power sensor monitoring the amount of power provided by the AC adapter to the portable electronic device and to the battery, the input power sensor producing a first signal indicative of the amount of power provided;

a current sensor coupled to the battery, the current sensor determining the amount of current provided to the battery; the current sensor producing a second signal indicative of the amount of current provided to the battery;

a voltage sensor coupled to the battery, the voltage sensor determining the voltage across the battery, the voltage sensor providing a third signal indicative of the amount of voltage across the battery;

a modulation circuit coupled between the AC adapter and the battery, the modulation circuit varying the amount of power provided to the battery by the AC adapter based upon the first, second and third signals;

wherein, the amount of power provided by the AC adapter to the battery and the portable electronic device varies with the power needs of the battery and the portable electronic device when the power needs are below the maximum power output.

* * * * *

UNITED STATES PATENT AND TRADEMARK OFFICE
CERTIFICATE OF CORRECTION

PATENT NO. : 6,127,809  
DATED : October 3, 2000  
INVENTOR(S) : Kates, Barry K.; Sheehan. Edward P., Jr.

It is certified that error appears in the above-identified patent and that said Letters Patent is hereby corrected as shown below:

The following U.S. Patents are included under "References Cited U.S. PATENT DOCUMENTS:"

| | | | |
|---|---|---|---|
| 5,352,970 | 10/4/1994 | Armstrong, III | 320/39 |
| ,355,077 | 10/11/1994 | Kates | 323/224 |
| ,430,641 | 7/4/1995 | Kates | 363/133 |
| ,625,275 | 4/29/1997 | Tanikawa, et al | 320/32 |
| ,698,964 | 12/16/1997 | Kates, et al | 320/22 |

<u>Column 8,</u>  
Line 31 insert --,-- between "battery's" and "said";  
Line 32, delete "said."

Signed and Sealed this

Nineteenth Day of June, 2001

*Attest:*

NICHOLAS P. GODICI  
*Attesting Officer*    *Acting Director of the United States Patent and Trademark Office*